(12) United States Patent
Downing

(10) Patent No.: US 10,081,288 B1
(45) Date of Patent: Sep. 25, 2018

(54) EMERGENCY UTILITY VEHICLE WITH HIGH-CLEARANCE FOLDING OUTRIGGERS

(71) Applicant: Altec Industries, inc., Birmingham, AL (US)

(72) Inventor: James A. Downing, Salem, VA (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 15/813,409

(22) Filed: Nov. 15, 2017

(51) Int. Cl.
*B60P 1/54* (2006.01)
*B60P 3/14* (2006.01)
*B60S 9/04* (2006.01)
*B66C 23/78* (2006.01)
*B60P 3/42* (2006.01)

(52) U.S. Cl.
CPC ............. *B60P 1/5485* (2013.01); *B60P 3/14* (2013.01); *B60P 3/426* (2013.01); *B60S 9/04* (2013.01); *B66C 23/78* (2013.01)

(58) Field of Classification Search
CPC .......... B60P 1/5485; B60P 3/14; B60P 3/426; B60S 9/00; B60S 9/02; B60S 9/04; B60S 9/10; B60S 9/12; B66C 23/78; B66C 23/80
USPC .................... 280/763.1, 764.1, 765.1, 766.1
See application file for complete search history.

(56) References Cited

U.S. PATENT DOCUMENTS

| | | | | |
|---|---|---|---|---|
| 3,912,289 A | * | 10/1975 | Czajkowski, Jr. | ...... F41A 23/56 200/188 |
| 5,706,960 A | | 1/1998 | Pitman et al. | |
| 6,257,619 B1 | * | 7/2001 | Bender | ...... B60S 9/10 212/304 |
| 7,364,044 B2 | * | 4/2008 | Hinata | ...... B66C 23/80 212/277 |
| 8,657,335 B2 | * | 2/2014 | Borghi | ...... B66C 23/80 280/764.1 |
| 9,550,475 B1 | * | 1/2017 | Walker | ...... B66C 23/78 |
| 2007/0284866 A1 | * | 12/2007 | Hanson | ...... E02F 9/085 280/763.1 |
| 2012/0261213 A1 | | 10/2012 | St-Yves et al. | |

* cited by examiner

*Primary Examiner* — John D Walters
(74) *Attorney, Agent, or Firm* — Erise IP, P.A.

(57) ABSTRACT

A utility vehicle is configured for use in emergency situations. The utility vehicle includes a base, a set of tracks, and a set of outriggers. The set of tracks is secured to the base configured to move the base through rough terrain. The set of outrigger is configured to be disposed in a stowed configuration and a deployed configuration. The outrigger is disposed above the deck level in the stowed configuration. The outrigger also remains outside the set of tracks in both the stowed configuration and the deployed configuration. The outrigger comprises an upper leg, a lower leg, and an actuator.

20 Claims, 8 Drawing Sheets

EMERGENCY UTILITY VEHICLE WITH HIGH-CLEARANCE FOLDING OUTRIGGERS

BACKGROUND

1. Field

Embodiments of the invention relate to the utility vehicles and the stabilization thereof. More specifically, embodiments of the invention relate to an emergency utility vehicle with high-clearance folding outriggers.

2. Related Art

Response to natural disasters, such as floods and hurricanes, are becoming increasingly common. The response to natural disasters often includes repairing power, communications, and other vital infrastructure. This not only returns the area to normalcy but can also assist in other relief efforts. However, these natural disasters can make maneuvering a traditional utility vehicle into and through the area very difficult. Further, these natural disasters make maintenance of the utility vehicle difficult, due to the adverse conditions.

Utility workers utilize aerial devices, cranes, and other utility vehicles to perform numerous tasks. Utility vehicles typically include a boom assembly that aids in performing the task. In the case of an aerial device, the boom assembly supports a utility platform in which one or more utility workers stand. In the case of a crane, the boom assembly lifts and moves heavy loads. In these and other scenarios, a stable utility vehicle prevents tipping or collapse.

Existing outriggers, used to stabilize the vehicle, provide numerous disadvantages. Radial outriggers have low ground clearance such that they cannot be emplaced around guardrails and other obstacles. Radial outriggers also have an actuator adjacent to the ground, which can allow mud and dirt to damage the outrigger. "Out-and-down" outriggers require two actuators (an "out" actuator and a "down" actuator) which places an actuator adjacent to the ground. Existing outriggers are therefore not suitable to these disaster scenarios.

SUMMARY

Embodiments of the invention solve the above-mentioned problems by providing a utility vehicle configured for use in emergency situations. In embodiments of the invention, the utility vehicle increases mobility through disaster regions by utilizing tracks. The utility vehicle also utilizes a new set of outriggers. The set of outriggers reduces wear on outriggers by each having a single actuator disposed at or above a deck level, to prevent or reduce contaminants in the actuator. The utility vehicle may also encase the actuator within the outrigger during transportation for further protection.

A first embodiment of the invention is directed to an outrigger configured to be installed on and deployed by a utility vehicle. The outrigger comprises an upper leg, a lower leg, and an actuator. The upper leg presents a proximal end and a distal end, and includes a torsion link and a tension link. The lower leg is pivotably secured at the distal end of the upper leg. The lower leg presents an upper end and a lower end. The actuator is pivotably secured to the lower leg at the upper end of the lower leg. The actuator is configured to selectively place the outrigger into a stowed configuration and a deployed configuration. The torsion link is vertically separated from the tension link in the deployed position.

A second embodiment of the invention is directed to a utility vehicle configured for use in emergency situations, the utility vehicle comprising a base and a set of outriggers. The base presents a deck level. The outrigger disposed at or above the deck level in a stowed configuration. The outrigger comprises an upper leg, a lower leg, and an actuator. The upper leg presents a proximal end and a distal end, and includes a torsion link and a tension link. The lower leg is pivotably secured at the distal end of the upper leg. The lower leg presents an upper end and a lower end. The actuator is pivotably secured to the lower leg at the upper end of the lower leg. The actuator is configured to selectively place the outrigger into a stowed configuration and a deployed configuration. The torsion link is vertically separated from the tension link in the deployed position.

A third embodiment of the invention is directed to a utility vehicle configured for use in emergency situations, the utility vehicle comprises a base, a set of tracks, and a set of outriggers. The set of tracks secured to the base configured to move the base through rough terrain. The outrigger is configured to be disposed in a stowed configuration and a deployed configuration. The outrigger is disposed above the deck level in the stowed configuration. The outrigger also remains outside the set of tracks in both the stowed configuration and the deployed configuration. The outrigger comprises an upper leg, a lower leg, and an actuator. The upper leg presents a proximal end and a distal end, and includes a torsion link and a tension link. The lower leg is pivotably secured at the distal end of the upper leg. The lower leg presents an upper end and a lower end. The actuator is pivotably secured to the lower leg at the upper end of the lower leg. The actuator is configured to selectively place the outrigger into a stowed configuration and a deployed configuration. The torsion link is vertically separated from the tension link in the deployed position.

Additional embodiments of the invention are directed to a method of installing the outrigger, a method of assembling the outrigger, a method of deploying the outrigger, a method of stowing the outrigger, or other such methods. Still other embodiments of the invention may be directed to a utility vehicle comprising a base, a boom assembly, and an outrigger such as described above. Yet other embodiments of the invention may be directed to an outrigger base configured to be installed on a base of a utility vehicle, a right side outrigger, and a left side outrigger each secured to the outrigger base.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
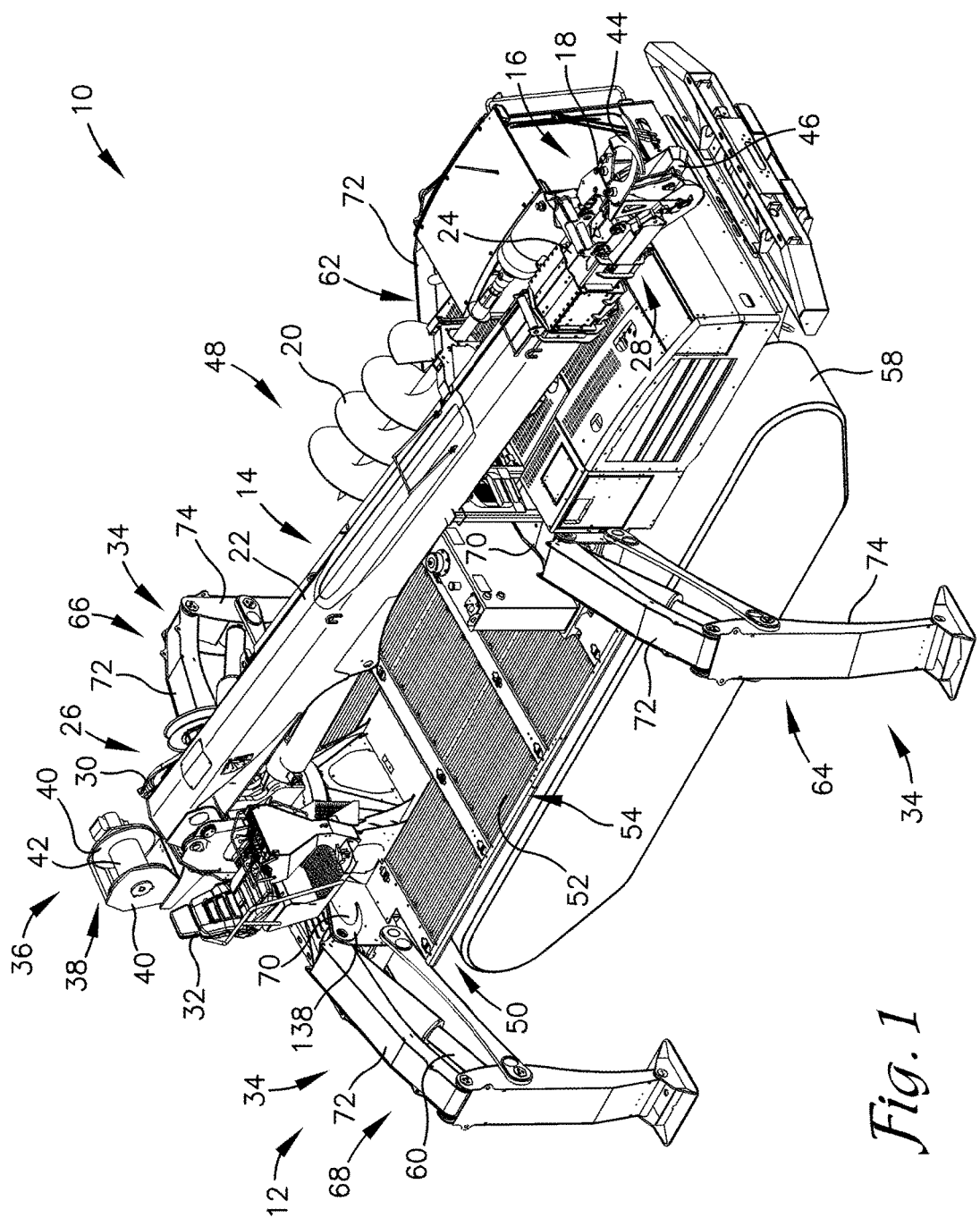
FIG. 1 is a perspective view of a utility vehicle with a set of outriggers in a deployed position, shown from a front right orientation.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

A utility vehicle 10 configured for emergency situations, constructed in accordance with various embodiments of the invention, is shown in FIG. 1. The utility vehicle 10 generally comprises a base 12 with a boom assembly 14 rotatably mounted thereto. An implement 16 (such as a pole guide 18, a digger derrick 20, a utility platform or other tool) is disposed on the boom assembly 14 to provide for the accomplishment of a task by a utility worker. The configurations to aid in repair and recover The boom assembly 14 broadly comprises an outer boom section 22 and at least one inner boom section 24. The boom assembly 14 presents a proximal end 26 and a distal end 28. The proximal end 26 is rotatably and/or pivotably secured to a boom turret 30 of the base 12. The proximal end 26 and/or the boom turret 30 may also have an associated static-operations cab 32. The static-operations cab 32 allows an operator to observe and control the operation of the boom assembly 14 while the utility vehicle 10 is stationary, with a set of outriggers 34 deployed (as discussed in detail below). The proximal end 26 of the boom assembly 14 may further comprise a winch 36 that is associated with a load line (not illustrated). The winch 36 includes a spool 38 and an associated hydraulic motor (not illustrated). The spool 38 includes two end caps 40 and a central section 42. The spool 38 rotates about a horizontal, lateral axis in response to actuation by the hydraulic motor. The load line is wrapped around the central section 42 of the first winch 36 and prevented from falling therefrom by the two end caps 40 of the winch 36.

Figure 2:
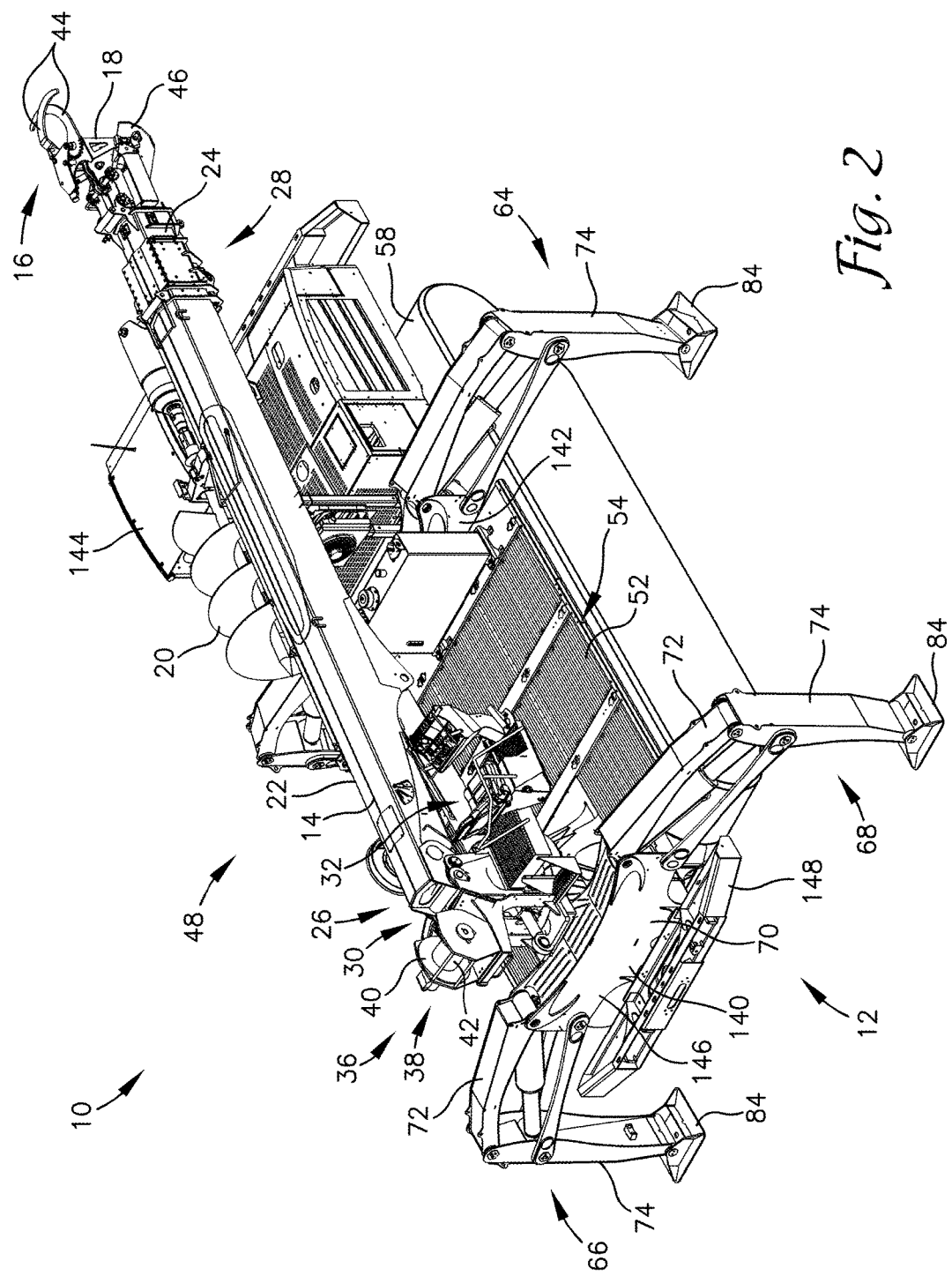
FIG. 2 is a perspective view of the utility vehicle of FIG. 1, shown from a rear right orientation.

The distal end 28 of the boom assembly 14 is configured to be secured with at least one implement 16. Depending on the type of utility vehicle 10 and the type of task to be performed, any of numerous implements 16 may be utilized. In the exemplary FIGS. 1-2 shown, the implement 16 is a pole guide 18. The pole guide 18 includes a set of pole guide tongs 44 configured to secure a utility pole against a pole guide base 46. In other embodiments, not illustrated, the implement 16 is a utility platform assembly. The utility platform assembly provides an elevated work station for an operator to perform various maintenance, installation, and repair tasks. Other implements 16 may be carried on the base 12 such that they may be selectively secured to the distal end 28 of the boom assembly 14, such as the digger derrick 20 illustrated in FIGS. 1 and 4. Other examples of implements 16 could include a jib, a load line, or other tool.

In embodiments of the invention, the boom assembly 14 comprises an outer boom section 22 and at least one inner boom section 24. The at least one inner boom section 24 is at least in part disposed within the outer boom section 22 assembly. The at least one inner boom section 24 telescopes to extend or retract into the outer boom section 22 assembly. In some embodiments, not illustrated, the boom assembly 14 may additionally or alternatively comprise a pivoting boom section (not illustrated) that does not telescope out of any other boom section. Instead the pivoting boom section rotates about the base 12, and the outer boom section 22 pivots and/or rotates relative to the pivoting boom section. The use of the pivoting boom section allows the utility platform assembly to reach certain areas and avoid obstacles in the working environment.

Figure 8:
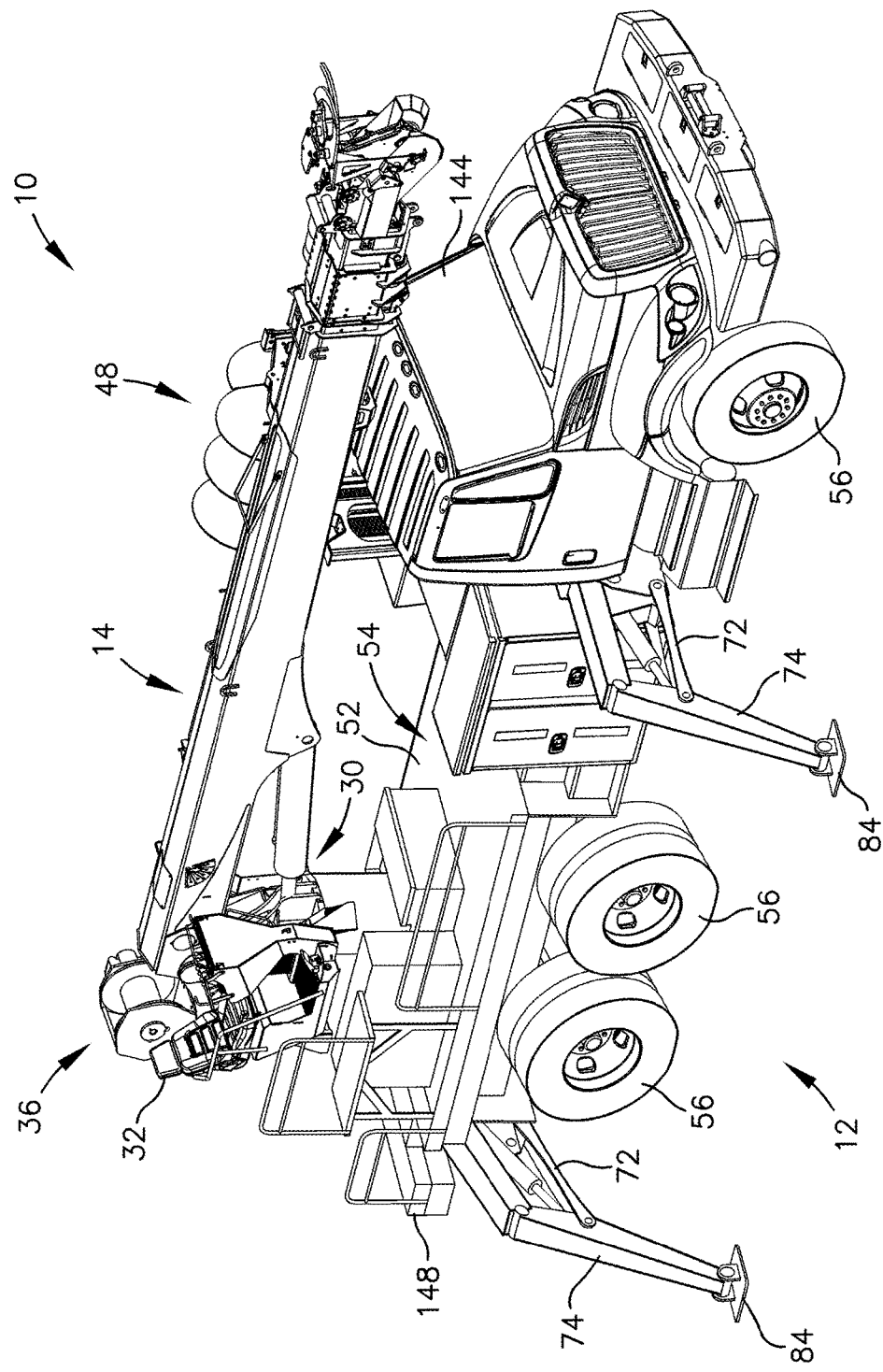
FIG. 8 is a perspective view of another embodiment of the utility vehicle that includes wheels instead of tracks.

The base 12 of the utility vehicle 10 is a selectively stabilized platform. In embodiments of the invention, the base 12 is an aerial device 48 (as illustrated in FIGS. 1 and 9), a crane base, an oilrig, an earth-working machine, an automobile, or a fixed structure. The base 12 provides stability and a counterweight to a load being supported by the boom assembly 14. The base 12 includes a chassis 50, which presents a deck 52 at a deck level 54. The chassis 50 of the utility vehicle 10 is typically mobile and moves via wheel 56 (as illustrated in FIG. 8) and/or tracks 58 (as illustrated in FIGS. 1-7) rotatably secured to the base 12 below deck level 54. The wheel 56 provide for faster mobility and lighter weight. Tracks 58 provide greater traction and durability. Some embodiments, not illustrated, may include both wheel 56 and tracks 58.

An exemplary embodiment of the invention is configured for usage in rough terrain. The rough terrain could be muddy, swampy, off-road, hilly, mountainous, slippery, brittle, wet, or some combination thereof. As a specific example, embodiments of the invention are configured for usage in response to natural disasters, such as floods and hurricanes. The response to natural disasters often includes repairing power, communications, and other vital infrastructure. This not only returns normalcy but can also assist in other relief efforts, by providing needed power to hospitals and shelters. However, these natural disasters can make maneuvering a traditional utility vehicle 10 into and through the area very difficult. Embodiments of the invention therefore include a base 12 that is configured to maneuver through and stabilize in these natural disaster areas and other difficult terrain areas. The base 12 may therefore include tracks 58, have outriggers 34 disposed at or above the tracks 58, and have other features to assist in maneuvering through these locations and situations.

The base 12 of the utility vehicle 10 utilizes at least one outrigger for stabilization. In embodiments of the invention, such as illustrated in FIGS. 1-5, the outriggers 34 deploy from atop or alongside the base 12. In other embodiments, the outriggers 34 deploy from below or within the base 12 (as illustrated in FIG. 8). To continue the above-discussed example, this keeps an actuator 60 of the outrigger 34 (discussed in more depth below) away from water, mud, and other contaminants. Deploying from atop or alongside the base 12 also allows for the utility vehicle 10 to utilize the tracks 58 for maneuvering.

Figure 3:
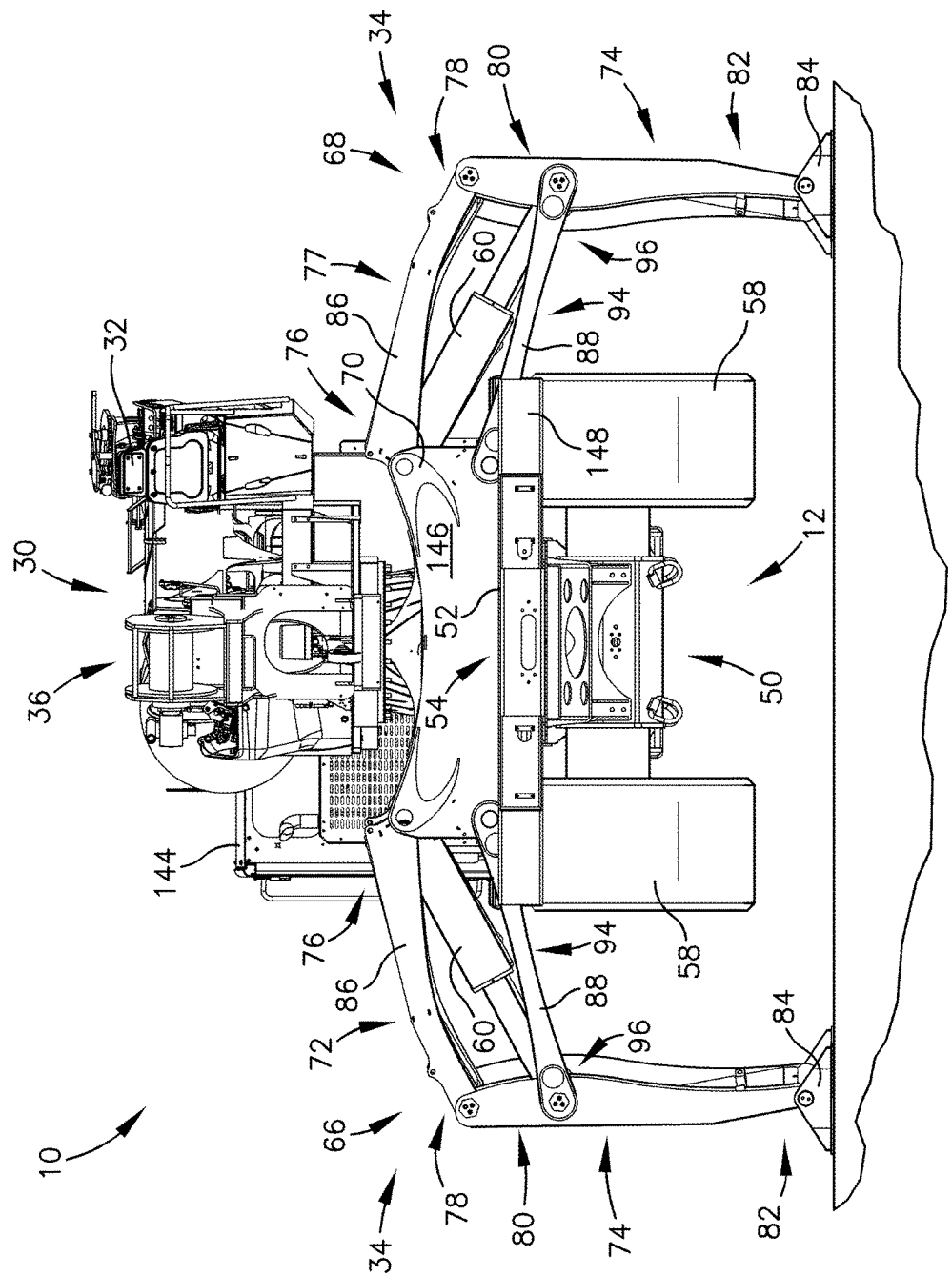
FIG. 3 is a rear view of the utility vehicle of FIG. 1.
Figure 4:
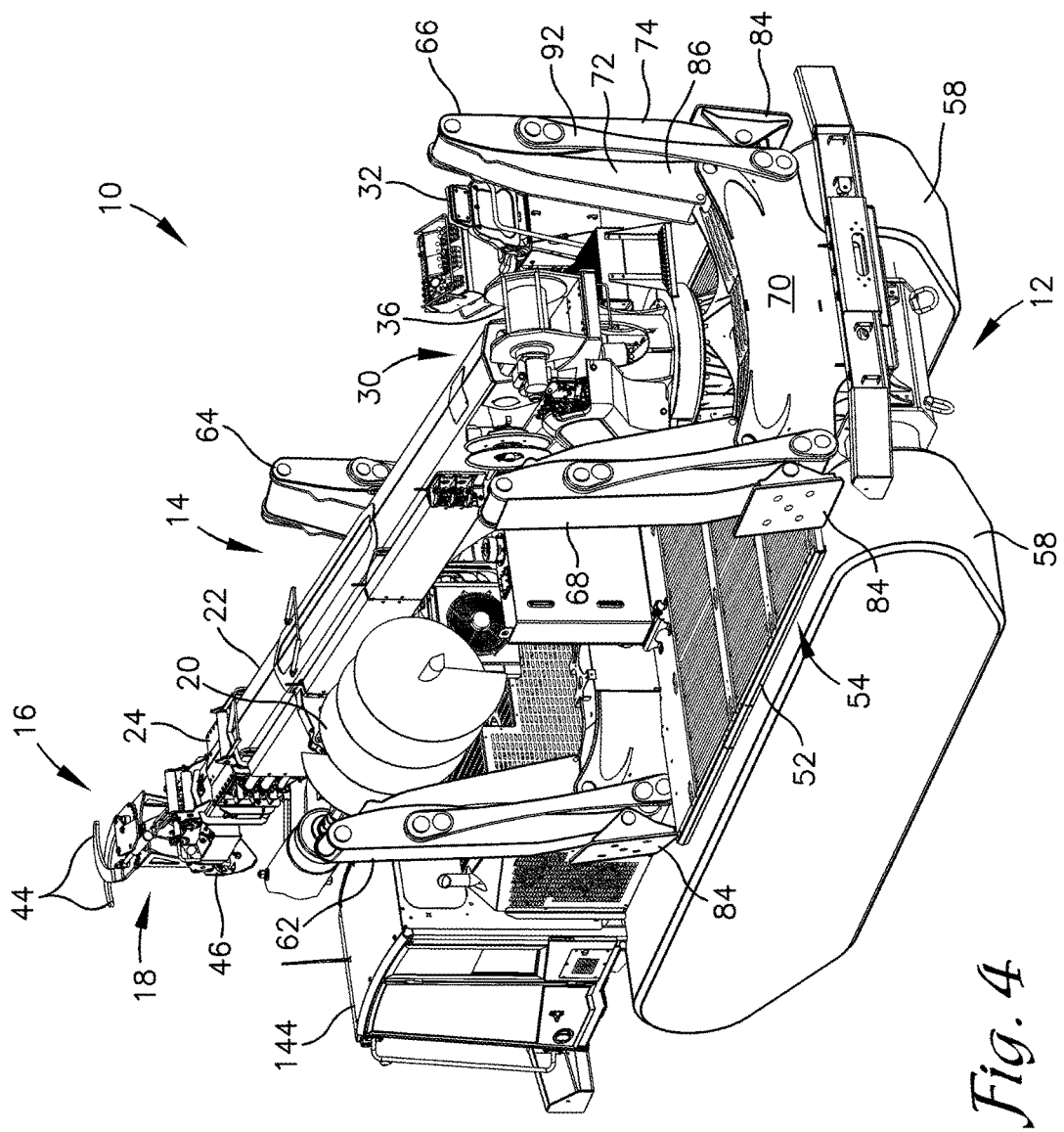
FIG. 4 is a perspective view of the utility vehicle with the set of outriggers in a stowed position, shown from a rear left orientation.
Figure 5:
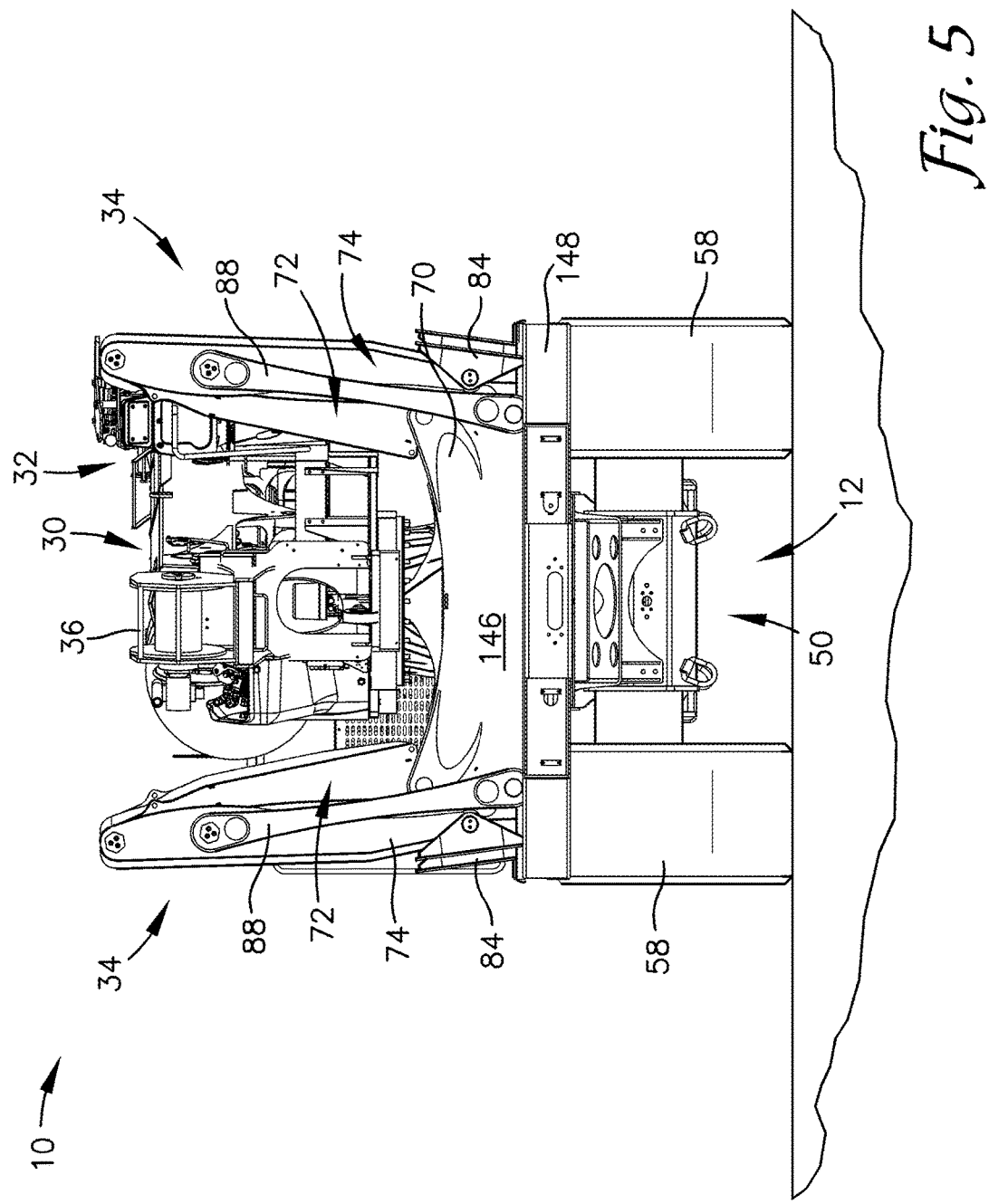
FIG. 5 is a rear view of the utility vehicle of FIG. 4.
Figure 6:
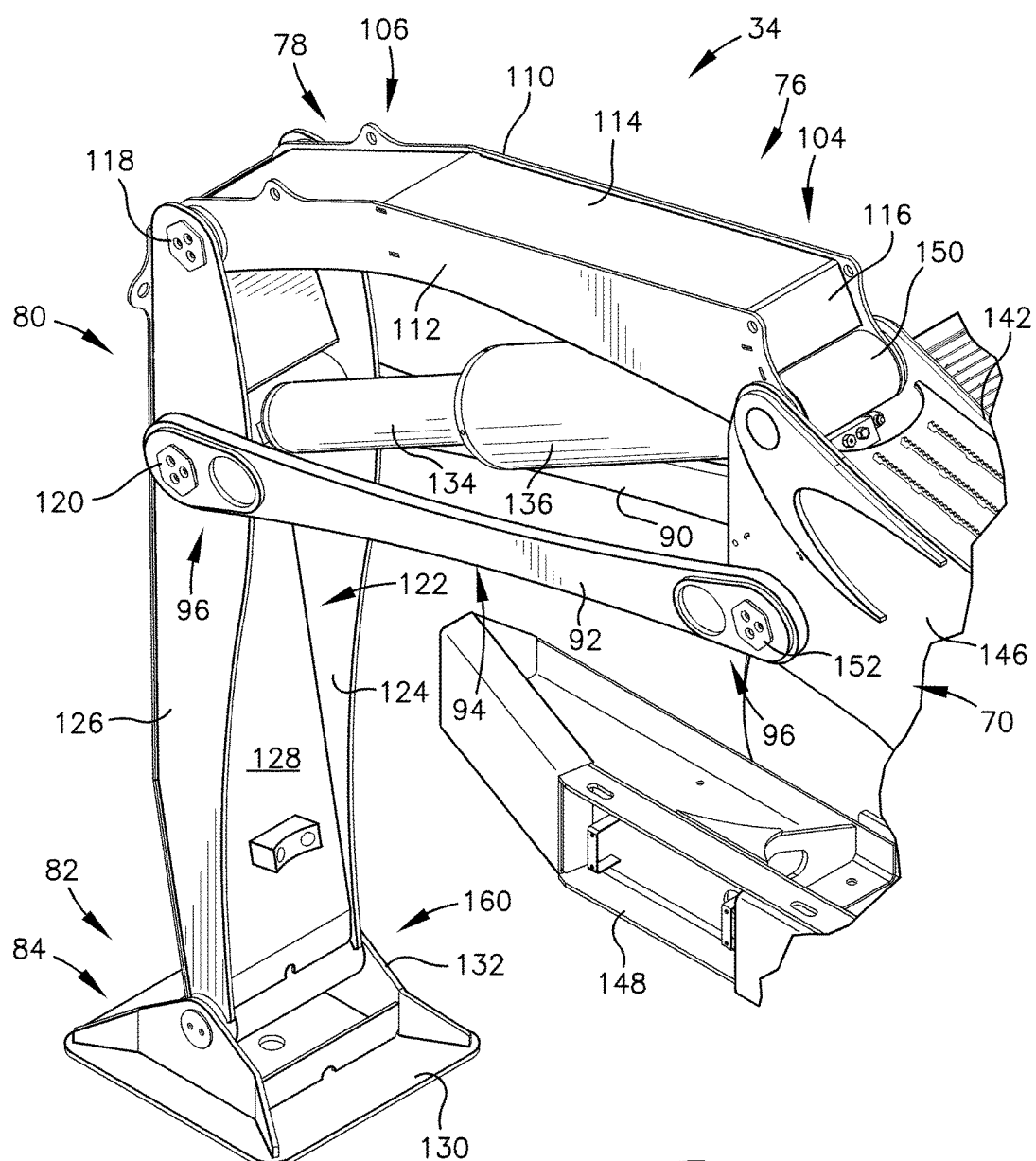
FIG. 6 is a perspective view of an outrigger, shown from a proximal orientation.
Figure 7:
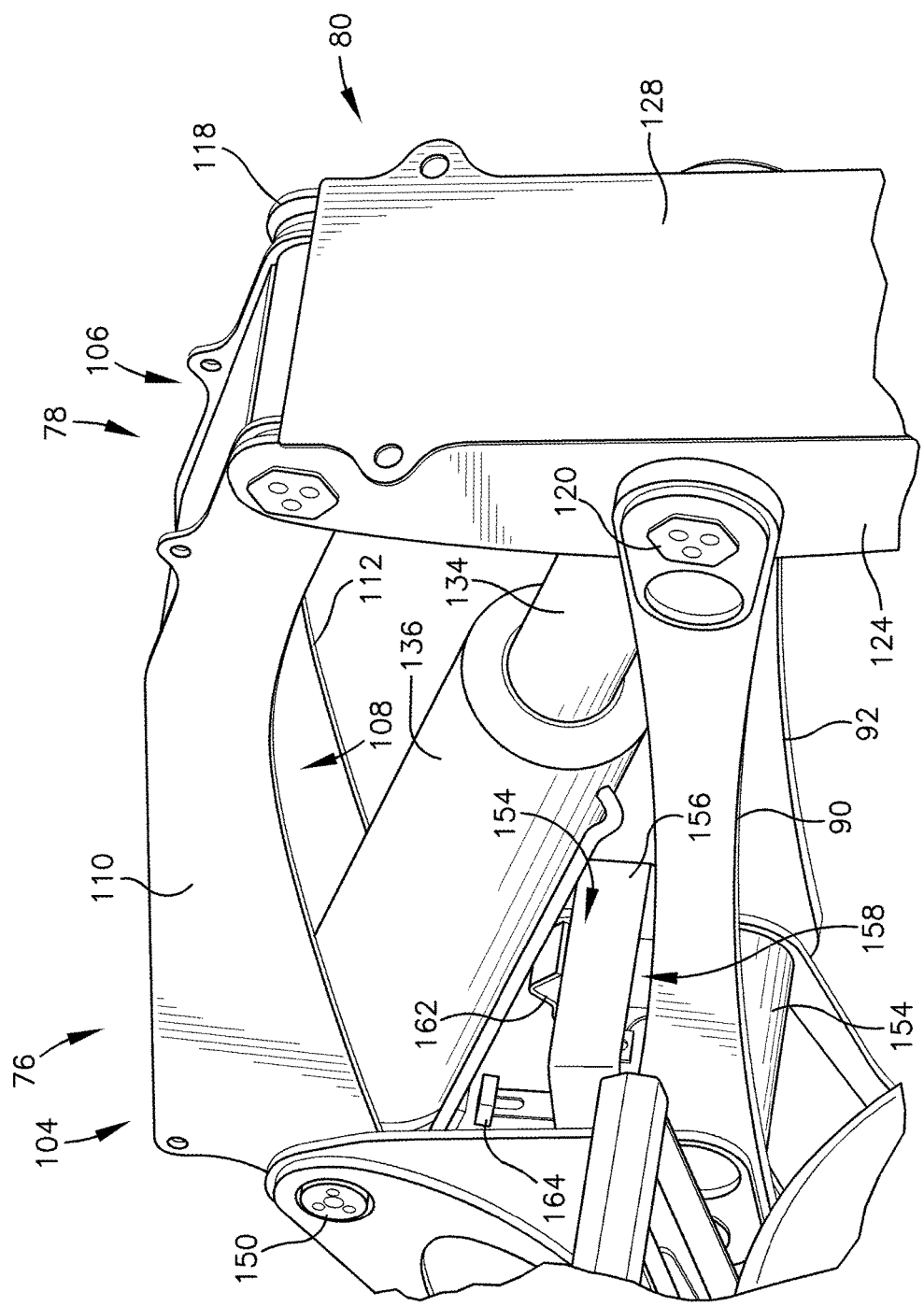
FIG. 7 is a perspective view of an upper leg of the outrigger, shown from a distal orientation.

The outriggers 34 are configured to be selectively placed into a stowed position (as shown in FIGS. 4-5) and a deployed position (as shown in FIGS. 1-3). When the outriggers 34 are in the stowed position, the utility vehicle 10 is free to maneuver via the wheel 56 and/or tracks 58 because the outriggers 34 are not in contact with the ground. When the outriggers 34 are in the deployed position, the utility vehicle 10 is prevented from maneuver because the outriggers 34 are in contact with the ground. In some embodiments, the outriggers 34 lift the wheel 56 and/or track at least a portion off of the ground (as best illustrated in FIG. 3). This further prevents movement of the utility vehicle 10 and provides a more stable platform for the task to be performed. While FIG. 3 shows flat terrain, the outriggers 34 may deploy on terrain that is un-level, slanted, or irregular.

In embodiments of the invention, the base 12 includes a plurality of outriggers 34, such as two, three, four, six, eight, etc. FIGS. 1-2 illustrated an exemplary base with four outriggers 34, a front-left outrigger 62, a front-right outrigger 64, a rear-left outrigger 66, and a rear-right outrigger 68. In embodiments of the invention, the outriggers 34 are deployed from the base 12 in a shape (when viewed from above) that is substantially X-shaped, H-shaped, T-shaped, I-shaped, or other configuration. Relative to a forward driving direction, the outriggers 34 may deploy forward and backward, to the sides, at some intermediate angle therebetween (such as degrees, 45 degrees, 60 degrees relative to the forward/backward direction), etc. One consideration during the determination of the layout of outriggers 34 relative to the base 12 is the size, shape, and weight distribution of the base 12. For example, if the base 12 is relatively long in the forward direction and relatively thin in the sideways direction, the outriggers 34 may deploy substantially perpendicular to the forward direction (i.e. the sideways direction). This is because the likelihood of the base 12 tipping forward or backward is reduced because of the relative length in the forward direction. A wide base 12 can therefore be achieved via a perpendicular deployment. As another example, if the base 12 is not substantially longer in the forward direction than in the sideways direction, the outriggers 34 may deploy in a diagonal direction relative to the forward direction, in a substantial X-shape when viewed from above. This is because the likelihood of the base 12 tipping forward or backward has not been reduced by the shape of the base 12.

The outrigger 34 will now be discussed in more detail. In embodiments of the invention the outrigger 34 is configured to be installed on and deployed by the utility vehicle 10. In some embodiments, the outriggers 34 are configured to be added to an existing utility vehicle 10. As such, the utility vehicle 10 may be upgraded with the outriggers 34 described below. Similarly, the existing utility vehicle 10 may be configured to be upgraded to the tracks 58 instead of wheel 56, which will provide the utility vehicle 10 with greater traction and durability. In some embodiments, the outriggers 34 and/or the tracks 58 are configured to be originally manufactured with the utility vehicle 10.

In embodiments of the invention, the outrigger 34 comprises an outrigger base 70, an upper leg 72, a lower leg 74, and the actuator 60. The outrigger base 70 is secured to the chassis 50 or other component of the base 12 of the utility vehicle 10. The upper leg 72 presents a proximal end 76 and a distal end 78. The upper leg 72 is pivotably connected at the proximal end 76 to the outrigger base 70 and pivotably connected at the distal end 78 to the lower leg 74. A separation angle (a) between the upper leg 72 and the lower leg 74 is set by the actuator 60. The separation angle (illustrated in FIG. 3) is a vertical angular displacement of the lower leg 74 relative to the upper leg 72. The actuator 60 is pivotably secured to the lower leg 74 to exert a force thereon. The lower leg 74 presents an upper end 80 and a lower end 82. The upper leg 72 and the actuator 60 are each pivotably secured to the upper end 80. The lower end 82 includes an outrigger foot 84 configured to interface with the ground. The outrigger foot 84 interfacing with the ground will provide a wider support base 12 that the wheel 56 or tracks 58 alone.

The outrigger 34 is configured to be disposed into either a stowed position and a deployed position. The outrigger 34 is moved between the stowed position and the deployed position by the actuator 60. In some embodiments, the actuator 60 may operate in response to direct command from the operator, which may instruct or otherwise cause the actuator 60 to elongate or shorten. In other embodiments, the actuator 60 may operate in response to a certain mode or action being selected by the operator (such as preparing to move the boom assembly 14 or preparing to move the utility vehicle 10).

An example of the stowed position is illustrated in FIGS. 4 and 5. In the stowed position, the upper leg 72, the lower leg 74, and the actuator 60 are all substantially aligned. In some embodiments, as shown in FIGS. 4 and 5, this alignment is a in a substantially vertical orientation. The vertical orientation provides greater vertical and horizontal clearance that other existing outrigger assemblies. The vertical clearance keeps the outrigger 34 out of the mud, water, and other contaminants, especially during movement to and from a work site. The horizontal clearance prevents the outrigger 34 from catching on various hazards during movement to and from a work site.

An example of the deployed position is illustrated in FIGS. 1-3. In the deployed position, the upper leg 72 and the lower leg 74 are separated by the separation angle being larger than in the stowed position. For example, in the stowed position as illustrated in FIG. 5, the separation angle (a) may be less than twenty degrees, less than ten degrees, or less than five degrees (or in a range therein). Continuing the example, the separation angle in the deployed position illustrated in FIG. 3 may be more than forty-five degrees, more than sixty degrees, or more than ninety degrees, more than one hundred and ten degrees (or in a range therein). In the deployed position, the outrigger foot 84 is in contact with the ground, the street, or other underlying surface. In the deployed position, the outrigger 34 may lift at least a portion of the base 12 off the underlying surface, or may provide enough lift to distribute at least a portion of the weight of the utility vehicle 10 onto the outrigger 34. In some embodiments, in the deployed position, the upper leg 72 is substantially horizontal and/or the lower leg 74 is substantially vertical.

In embodiments of the invention, the upper leg 72 comprises a torsion link 86 and a tension link 88. In the deployed position, the torsion link 86 is generally disposed above the tension link 88. It should be appreciated that the term "torsion" link is used to signify that a substantial portion of the torsion placed on the upper leg 72 is borne by the torsion link 86. Similarly, the term "tension" link is used to signify that a substantial portion of the tension placed upon the upper leg 72 is borne by the tension link 88. It should also be appreciated that the torsion link 86 will bear some tension and the tension link 88 will bear some torsion.

In the deployed position, the torsion link 86 is vertically separated from the tension link 88 in the deployed position. Generally, the torsion link 86 is disposed above the tension link 88. In some embodiments, the torsion link 86 is substantially parallel to the tension link 88 in both the deployed position and the stowed position.

In embodiments of the invention, the tension link 88 comprises an anterior tension plate 90 and a posterior tension plate 92. In some embodiments, each of the anterior tension plate 90 and the posterior tension plate 92 present a narrow central segment 94 and an enlarged end segment 96. Each of the anterior tension plate 90 and the posterior tension plate 92 are generally elongated and present a proximal end 98 and a distal end 100. The anterior tension plate 90 is disposed substantially parallel to the posterior tension plate 92, so as to present a space 102 therebetween. In some embodiments, at least a portion of the actuator 60 is at least partially disposed in the space 102 between the torsion link 86 and the tension link 88. The space 102 is formed by the anterior tension plate 90 and the posterior tension plate 92 each being pivotably secured to both the outrigger base 70 and the lower leg 74. More specifically, the distal end 100 of the anterior tension plate 90 and the distal end 100 of the posterior tension plate 92 are each pivotably secured to the lower leg 74 at a lower moving pivot 120. The proximal end 98 of the anterior tension plate 90 and the proximal end 98 of the posterior tension plate 92 are each pivotably secured to the outrigger base 70, as discussed in more depth below.

In embodiments of the invention, the torsion link 86 is elongated so as to present a proximal end 104 and a distal end 106. The torsion link 86 presents a channel 108 therein for receiving at least a portion of the actuator 60 in the stowed position. The channel 108 is formed by an anterior side plate 110, a posterior side plate 112, and a top side plate 114. The torsion link 86 includes the anterior side plate 110 and the posterior side plate 112 secured between the top side plate 112. The torsion link 86 may be monolithic, or may be formed by permanently securing the respective side plates 110,112,114 such as by welding. In some embodiments, the torsion link 86 may further comprise at least one end plate 116 disposed at the proximal end 104 and/or the distal end 106 of the torsion link 86.

The lower leg 74 is elongated so as to present the upper end 80 and the lower end 82. As discussed above, the upper end 80 of the lower leg 74 is pivotably secured at the distal end 78 of the upper leg 72. The lower leg 74 presents an upper moving pivot 118 and a lower moving pivot 120. The torsion link 86 is pivotably secured to the upper moving pivot 118. The tension link 88 is pivotably secured to the lower moving pivot 120. In embodiments of the invention, the actuator 60 is pivotably secured to the lower moving pivot 120, as best illustrated in FIG. 3. In other embodiments, not illustrated, the actuator 60 is pivotably secured at an intermediate location between the lower moving pivot 120 and the upper moving pivot 118. In still other embodiments, not illustrated, the actuator 60 is pivotably secured below the lower moving pivot 120.

In embodiments of the invention, the lower leg 74 presents a channel 122 therein for receiving at least a portion of the actuator 60 in the stowed position. The channel 108 of the lower leg 74 is formed by an anterior side plate 124, a posterior side plate 126, and a distal side plate 128. The lower leg 74 includes the anterior side plate 124 and the posterior side plate 126 secured between the distal side plate 128. The lower leg 74 may be monolithic, or may be formed by permanently securing the respective side plates 124,126, 128 such as by welding.

In embodiments of the invention, the lower leg 74 includes the outrigger foot 84 pivotably secured to the lower end 82 of the lower leg 74. The outrigger foot 84 is pivotably secured to the lower leg 74 at a foot pivot. The outrigger foot 84 is configured to interface with the ground. The outrigger foot 84 includes a pad 130 and at least one pad protrusion 132 extending therefrom. The pad protrusions 132 are pivotably secured to the foot pivot. In embodiments of the invention, as shown in FIGS. 3 and 5, the outrigger foot 84 is passive. A passive outrigger foot 84 does not include any mechanism to pivot or move the outrigger foot 84. As will be discussed below, the passive outrigger foot 84 may be manipulated into a deployed position (as shown in FIG. 3) and a stowed position (as shown in FIG. 5) indirectly by the actuator 60. In other embodiments, not illustrated, the outrigger foot 84 is active, e.g., includes an actuator 60, motor, or other component to change the angle of the outrigger foot 84 relative to the lower leg 74. In still other embodiments, the outrigger foot 84 is static, such that it does not substantially move angularly relative to the ground.

The actuator 60 is pivotably secured to the lower leg 74 at the upper end 80 of the lower leg 74 and to the outrigger base 70 and/or the upper leg 72. The actuator 60 is configured to selectively place the outrigger 34 into the stowed configuration and the deployed configuration. Typically, the actuator 60 will shorten to place the outrigger 34 into the stowed configuration and elongate to place the outrigger 34 into the deployed configuration. The actuator 60 pushes and pulls against the lower leg 74 relative to the upper leg 72 and/or the outrigger base 70. As opposed to prior art systems, which include at least a portion of the actuator 60 being adjacent to or near the outrigger foot 84 (such that the portion of the actuator 60 could be compromised with mud, flood waters, and other contaminants), the actuator 60 of embodiments of the invention is configured to remain vertically separated from the ground. This configuration keeps the relatively fragile and expensive actuators away from contaminants.

In embodiments of the invention, the actuator 60 is a hydraulic cylinder. The hydraulic cylinder comprises a rod 134 disposed at least partially within a barrel 136. The rod 134 includes a piston (not illustrated) fully disposed within the barrel 136. A void (not illustrated) is formed between the piston and the barrel 136 and a cap on the interior side. The hydraulic cylinder is elongated by pumping hydraulic fluid into the void so as to enlarge the void (and by extension push the rod 134 and piston relative to the barrel 136. The pumping is performed by a pump via hydraulic lines. In other embodiments, the actuator 60 is a pneumatic cylinder, which uses air or another gas in lieu of the hydraulic fluid. In still other embodiments, the actuator 60 is an electric motor or other type of motor.

The outrigger base 70 is configured to be secured to the chassis 50 of the utility vehicle 10. In some embodiments, the outrigger base 70 is originally manufactured as a component of the chassis 50. In other embodiments, the outrigger base 70 is configured to be added to an existing chassis 50, such as upon an existing deck 52. In embodiments, as illustrated in FIGS. 1-3, at least a portion of the outrigger base 70 is disposed at or above the deck level 54 of the base 12. By extension, the outrigger base 70 is disposed above the set of tracks 58, such that the tracks 58 rotate below the outrigger base 70. This allows the outriggers 34 to operate without interfering with the tracks 58 and keeps the outriggers 34 out of the mud, flood waters, and other contaminants.

In embodiments of the invention, the outrigger base 70 comprises an anterior plate 138 and a posterior plate 140. As illustrated in FIGS. 1-2, a single outrigger base 70 may support two opposing outriggers 34 (e.g., a left side outrigger and a right side outrigger). In these embodiments, the anterior plate 138 and the posterior plate 140 traverse the chassis 50 between a left side and a right side. The base 12 of the utility vehicle 10 may therefore include an anterior outrigger base 142 between the boom turret 30 of the boom assembly 14 and a mobile-operations cab 144 of the base 12. Similarly, the base 12 of the utility vehicle 10 may include a posterior outrigger base 146 between the boom turret 30 of the boom assembly 14 and a rear bumper 148 of the base 12. In other embodiments, other arrangements of the outrigger base 70 may be used.

As discussed above, the proximal end 76 of the upper leg 72 is configured to be secured to the outrigger base 70. The outrigger base 70 presents an upper static pivot 150 and a lower static pivot 152. The torsion link 86 is pivotably secured to the upper static pivot 150. The tension link 88 is pivotably secured to the lower static pivot 152. In some embodiments, the actuator 60 is pivotably secured to the upper static pivot 150. In other embodiments, the actuator 60 is pivotably secured to the lower static pivot 152. In still other embodiments, the actuator 60 is pivotably secured at an intermediate location between the upper static pivot 150 and the lower static pivot 152.

As discussed above, embodiments of the invention are configured to keep the actuator 60 above a water line, out of the mud, or otherwise above and out of contaminants. To accomplish this, the outrigger foot 84 is provided without a foot actuator 60. Further, the actuator 60 does not attach adjacent to the outrigger foot 84. In some embodiments, the outrigger foot 84 is static, such that the outrigger foot 84 is secured in a deployed position. In these embodiments, the outrigger foot 84 remains in the deployed position regardless of the position of the outrigger 34. In other embodiments, such as illustrated in FIGS. 3 and 5, the outrigger foot 84 is passive, such that the outrigger foot 84 is moved between the deployed position and the stowed position by an external component, as discussed below.

In embodiments of the invention, the outrigger 34 includes a static foot manipulator 154 secured to the outrigger base 70. The outrigger foot 84 is configured to be selectively placed into the stowed configuration by striking the static foot manipulator 154 while the lower leg 74 is being moved by the actuator 60. The static foot manipulator 154 moves the passive outrigger foot 84 between the deployed position and the stowed position. The static foot manipulator 154 is disposed adjacent to the outrigger base 70 such that the static foot manipulator 154 changes the angle of the outrigger foot 84 relative to the lower leg 74 while the lower leg 74 is near the outrigger base 70 (e.g., almost into or out of the stowed position).

The static foot manipulator 154 includes a plate 156 disposed across a void 158 in the outrigger base 70. The plate 156 is configured to interact with a foot protrusion 160 of the outrigger foot 84. The plate 156 presses against the foot protrusion 160 while the outrigger 34 is moving into the stowed position. My pressing against the foot, the plate 156 causes the foot to pivot downward. Upon the outrigger 34 moving to the deployed position, the plate 156 presses against the pad 130 (or other component) of the outrigger foot 84 to cause the outrigger foot 84 to return to the deployed position.

In other embodiments, the outrigger 34 includes an active foot manipulator (not illustrated) that includes a foot actuator 60 for moving the passive outrigger foot 84 between the stowed position and the deployed position. The active foot manipulator is disposed at or above the deck level 54 of the chassis 50 of the base 12.

In embodiments of the invention, the lower leg 74 is configured to be retained in the stowed position by a static spring latch 162. The static spring latch 162 is configured to catch a protrusion of the lower leg 74. The static spring latch 162 keeps the lower leg 74 (and by extension, the rest of the outrigger 34) in the stowed position. For example, this keeps the outrigger 34 secured during movement of the utility vehicle 10 to and from a worksite. The force of the static spring catch is then overcome by the actuator 60 to move the outrigger 34 out of the stowed position.

In embodiments of the invention, the outrigger 34 further comprises a proximity sensor 164 or other type of sensor. The proximity sensor 164 comprises a proximity sensor module and a sensor controller (not illustrated). The proximity sensor module is configured to transmit a burst of wireless electromagnetic energy, then receive reflections of this energy when it bounces off another object, such as the lower leg 74. Numerous different types and models of proximity sensors 164 may be utilized in various embodiments of the invention. The proximity sensor module may comprise an integrated combination of a position sensitive detector ("PSD"), a n infrared emitting diode ("IRED"), and a signal processing circuit. Triangulation between the PSD and the IRED is used to determine distance to an object. The signal processing circuit provides a proximity detection signal to the sensor controller via a sensor cable or other connection. The proximity detection signal is indicative that the lower leg 74 is adjacent to the proximity sensor 164 (such that the outrigger 34 is in the stowed position). Embodiments of the invention may include a failsafe such that movement of the vehicle (via the wheel 56 and/or tracks 58) is not allowed until the proximity detection signal is received from all outriggers 34.

In embodiments of the invention, the various components of the outrigger 34 are formed of a metal to provide structural stability and strength. In other embodiments of the invention, the various components of the outrigger 34 are formed of a hardened polymer to provide dielectric qualities to prevent the unintended discharge of electricity through the outrigger 34. In still other embodiments of the invention, some components of the outrigger 34 are formed of metal and other components of the outrigger 34 are formed of a hardened polymer, so as to provide structural support while providing dielectric properties.

In other embodiments, not illustrated, the outriggers 34 deploy in a direction substantially level with the ground. In these embodiments, the outrigger foot 84 may present a substantially elongated vertical shape, such that the outrigger foot 84 may traverse the distance between the outrigger 34 and the ground. In the industry, these types of outriggers 34 are called "out and down" outriggers 34. In other embodiments, the outriggers 34 deploy diagonally downward toward the ground. In these embodiments, the outrigger foot 84 presents a shortened vertical shape.

It should be appreciated that for purposes of clarity in this description, the ground is presumed to be level and flat. In many instances of practical usage, the ground is not substantially level. Embodiments of the present invention can accommodate un-level and un-even ground angles, such as up to degrees, up to 10 degrees, up to 30 degrees, up to 45 degrees, etc.

A method of deploying an outrigger foot 84 includes instructing an actuator 60 to elongate. The instruction may be provided digitally, electronically, mechanically, hydraulically, pneumatically, or other instruction media. The elongation of the actuator 60 causes the outrigger 34 to move to the deployed position. The elongation may stop upon the actuator 60 reaching a maximum elongation, proper emplacement being detected, the base 12 lifting off the underlying surface, or other indication.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An outrigger configured to be installed on and deployed by a utility vehicle, the outrigger comprising:
    an outrigger base configured to be secured to a chassis of the utility vehicle;
    an upper leg presenting a proximal end and a distal end, said upper leg including a torsion link and a tension link;
    a lower leg pivotably secured at the distal end of the upper leg,
    wherein the lower leg presents an upper end and a lower end;
    an actuator pivotably secured to the lower leg at the upper end of the lower leg,
    wherein the actuator is configured to selectively place the outrigger into a stowed configuration and a deployed configuration,
    wherein the torsion link is vertically separated from the tension link in the deployed position;
    an outrigger foot pivotably secured to the lower end of the lower leg; and
    a static foot manipulator secured to the outrigger base,
    wherein the outrigger foot is configured to be selectively placed into the stowed configuration by striking the static foot manipulator while the lower leg is being moved by the actuator.

2. The outrigger of claim 1, wherein the torsion link is disposed substantially parallel to the tension link in both the stowed configuration and the deployed configuration.

3. The outrigger of claim 1, wherein the torsion link, the tension link, the lower leg, and the actuator are disposed in a substantially vertical orientation in the stowed configuration.

4. The outrigger of claim 1,
    wherein the lower leg presents an upper moving pivot and a lower moving pivot,
    wherein the torsion link is pivotably secured to the upper moving pivot,
    wherein the tension link is pivotably secured to the lower moving pivot.

5. The outrigger of claim 4, wherein the actuator is pivotably secured to the lower moving pivot.

6. The outrigger of claim 1,
    wherein the proximal end of the upper leg is configured to be secured to the outrigger base,
    wherein the outrigger base presents an upper static pivot and a lower static pivot,
    wherein the torsion link is pivotably secured to the upper static pivot,
    wherein the tension link is pivotably secured to the lower static pivot.

7. The outrigger of claim 6, wherein the actuator is pivotably secured to the upper static pivot.

8. The outrigger of claim 1,
    wherein the tension link comprises an anterior tension plate and a posterior tension plate,
    wherein the actuator is at least partially disposed between the anterior tension plate and the posterior tension plate.

9. The outrigger of claim 8,
    wherein the torsion link presents a channel therein for receiving at least a portion of the actuator in the stowed position,
    wherein the actuator is further covered by the lower leg in the stowed position such that the actuator is protected from damage,
    wherein the lower leg is configured to be retained in the stowed position by a static spring latch.

10. A utility vehicle configured for use in emergency situations, the utility vehicle comprising:
    a base presenting a deck level;
    an outrigger disposed above the deck level in a stowed configuration,
    said outrigger comprising:
        an upper leg presenting a proximal end and a distal end, said upper leg including a torsion link and a tension link;
        a lower leg pivotably secured at the distal end of the upper leg,
        wherein the lower leg presents an upper end and a lower end; and
        an actuator pivotably secured to the lower leg at the upper end of the lower leg,
        wherein the actuator is configured to selectively place the outrigger into the stowed configuration and a deployed configuration,
        wherein the actuator is disposed above the deck level in both the stowed configuration and the deployed configuration.

11. The utility vehicle of claim 10, wherein the base include a set of tracks for moving the base.

12. The utility vehicle of claim 10, wherein the torsion link, the tension link, the lower leg, and the actuator are disposed in a substantially vertical orientation in the stowed configuration.

13. The utility vehicle of claim 10,
    wherein the lower leg presents an upper moving pivot and a lower moving pivot,
    wherein the torsion link is pivotably secured to the upper moving pivot,
    wherein the tension link is pivotably secured to the lower moving pivot,
    wherein the actuator is pivotably secured to the lower moving pivot.

14. The outrigger of claim 10, further comprising:
an outrigger base configured to be secured to the chassis of the utility vehicle,
wherein the proximal end of the upper leg is configured to be secured to the outrigger base,
wherein the outrigger base presents an upper static pivot and a lower static pivot,
wherein the torsion link is pivotably secured to the upper static pivot,
wherein the tension link is pivotably secured to the lower static pivot,
wherein the actuator is pivotably secured to the upper static pivot;
an outrigger foot pivotably secured to the lower end of the lower leg; and
a static foot manipulator secured to the outrigger base,
wherein the outrigger foot is configured to be selectively placed into the stowed configuration by striking the static foot manipulator while the lower leg is being moved by the actuator.

15. The utility vehicle of claim 14, further comprising:
a proximity sensor secured to the outrigger base,
wherein the proximity sensor is oriented outward from the outrigger base such that the proximity sensor emits a beam toward the lower leg in the stowed position,
wherein the proximity sensor is configured to generate a proximity detection signal,
wherein the proximity detection signal is indicative that the outrigger is in the stowed position.

16. A utility vehicle configured for use in emergency situations, the utility vehicle comprising:
a base presenting a deck level;
a set of tracks secured to the base configured to move the base through rough terrain,
an outrigger configured to be disposed in a stowed configuration and a deployed configuration,
wherein the outrigger is disposed above the deck level in the stowed configuration,
wherein the outrigger remains outside the set of tracks in both the stowed configuration and the deployed configuration,
said outrigger comprising:
an upper leg presenting a proximal end and a distal end, said upper leg including a torsion link and a tension link;
a lower leg pivotably secured at the distal end of the upper leg,
wherein the lower leg presents an upper end and a lower end; and
an actuator pivotably secured to the lower leg at the upper end of the lower leg,
wherein the actuator is configured to selectively place the outrigger into the stowed configuration and a deployed configuration,
wherein the actuator is disposed above the deck level in both the stowed configuration and the deployed configuration.

17. The utility vehicle of claim 16,
wherein the lower leg presents an upper moving pivot and a lower moving pivot,
wherein the torsion link is pivotably secured to the upper moving pivot,
wherein the tension link is pivotably secured to the lower moving pivot,
wherein the actuator is pivotably secured to the lower moving pivot.

18. The outrigger of claim 16, further comprising:
an outrigger base configured to be secured to the chassis of the utility vehicle,
wherein the proximal end of the upper leg is configured to be secured to the outrigger base,
wherein the outrigger base presents an upper static pivot and a lower static pivot,
wherein the torsion link is pivotably secured to the upper static pivot,
wherein the tension link is pivotably secured to the lower static pivot,
wherein the actuator is pivotably secured to the upper static pivot.

19. The utility vehicle of claim 16, further comprising:
a proximity sensor secured to the outrigger base,
wherein the proximity sensor is oriented outward from the outrigger base such that the proximity sensor emits a beam toward the lower leg in the stowed position,
wherein the proximity sensor is configured to generate a proximity detection signal,
wherein the proximity detection signal is indicative that the outrigger is in the stowed position.

20. The outrigger of claim 16, wherein the torsion link, the tension link, the lower leg, and the actuator are disposed in a substantially vertical orientation in the stowed configuration.

* * * * *